(12) United States Patent
Wiesbeck et al.

(10) Patent No.: US 10,513,252 B2
(45) Date of Patent: Dec. 24, 2019

(54) CONTROL SYSTEM HAVING AT LEAST ONE ELECTRONIC CONTROL UNIT FOR CONTROLLING AN INTERNAL COMBUSTION ENGINE IN A HYBRID VEHICLE

(71) Applicant: Bayerische Motoren Werke Aktiengesellschaft, Munich (DE)

(72) Inventors: Ferdinand Wiesbeck, Munich (DE); Mark Van Gelikum, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 15/988,154

(22) Filed: May 24, 2018

(65) Prior Publication Data

US 2018/0265070 A1    Sep. 20, 2018

Related U.S. Application Data

(63) Continuation of application No. PCT/EP2016/078852, filed on Nov. 25, 2016.

(30) Foreign Application Priority Data

Nov. 27, 2015 (DE) .................. 10 2015 223 588

(51) Int. Cl.
*B60K 6/48* (2007.10)
*B60W 10/06* (2006.01)
(Continued)

(52) U.S. Cl.
CPC .............. *B60W 10/06* (2013.01); *B60K 6/20* (2013.01); *B60K 6/24* (2013.01); *B60K 6/26* (2013.01);
(Continued)

(58) Field of Classification Search
CPC ........ Y02T 10/6291; B60K 6/20; B60K 6/24; B60K 6/26; B60K 2006/268; F02N 11/00;
(Continued)

(56) References Cited

U.S. PATENT DOCUMENTS 8,301,323 B2 * 10/2012 Niwa .................... B60W 20/12
701/22
2001/0039230 A1 * 11/2001 Severinsky ............ B60H 1/004
477/3
(Continued)

FOREIGN PATENT DOCUMENTS

DE    198 31 487 C1    3/2000
DE    100 35 027 A1    1/2002
(Continued)

OTHER PUBLICATIONS

International Search Report (PCT/ISA/210) issued in PCT Application No. PCT/EP2016/078852 dated Mar. 7, 2017 with English translation (six (6) pages).
(Continued)

*Primary Examiner* — Hieu T Vo
*Assistant Examiner* — Arnold Castro
(74) *Attorney, Agent, or Firm* — Crowell & Moring LLP

(57) ABSTRACT

In a control system having at least one electronic control unit for controlling an internal combustion engine in a hybrid vehicle, the control unit is designed in such a way that it evaluates input signals for detecting data for identifying a current situation and for identifying at least one situation prevailing in the near future with regard to an expected speed and load curve. The control system controls, in a manner that is adaptive to the situation, the restart and shutoff of the internal combustion engine.

9 Claims, 4 Drawing Sheets

(51) Int. Cl.

| | | |
|---|---|---|
| *B60W 10/08* | (2006.01) | |
| *B60W 20/40* | (2016.01) | |
| *B60W 50/00* | (2006.01) | |
| *F02N 11/00* | (2006.01) | |
| *B60W 20/00* | (2016.01) | |
| *B60K 6/20* | (2007.10) | |
| *B60W 20/12* | (2016.01) | |
| *B60K 6/24* | (2007.10) | |
| *B60K 6/26* | (2007.10) | |
| *F02N 11/08* | (2006.01) | |

(52) U.S. Cl.
CPC ............ *B60W 10/08* (2013.01); *B60W 20/12* (2016.01); *B60W 50/0097* (2013.01); *F02N 11/0822* (2013.01); *F02N 11/0837* (2013.01); *B60K 2006/268* (2013.01); *B60W 2050/0073* (2013.01); *B60W 2510/244* (2013.01); *B60W 2520/10* (2013.01); *B60W 2540/10* (2013.01); *B60W 2550/22* (2013.01); *B60W 2720/103* (2013.01); *F02N 2200/0801* (2013.01); *F02N 2200/101* (2013.01); *F02N 2200/125* (2013.01); *F02N 2300/2006* (2013.01); *Y02T 10/6291* (2013.01)

(58) Field of Classification Search
CPC ............... F02N 11/0837; B60W 20/12; B60W 50/0097; B60W 2550/22; B60W 2550/0073; B60W 2520/10; B60W 2520/244
See application file for complete search history.

(56) References Cited

U.S. PATENT DOCUMENTS

| | | | | |
|---|---|---|---|---|
| 2003/0006076 | A1* | 1/2003 | Tamor | B60W 20/10 180/65.25 |
| 2007/0112496 | A1* | 5/2007 | Ji | B60K 6/445 701/70 |
| 2007/0192013 | A1* | 8/2007 | Bando | B60T 7/22 701/93 |
| 2011/0166740 | A1* | 7/2011 | Desborough | B60W 10/08 701/31.4 |
| 2011/0276209 | A1* | 11/2011 | Suganuma | B60W 10/06 701/22 |
| 2013/0179007 | A1* | 7/2013 | Dalum | H01M 10/48 701/2 |
| 2014/0277971 | A1* | 9/2014 | Oshiro | B60W 50/14 701/51 |
| 2015/0314775 | A1 | 11/2015 | Dextreit et al. | |
| 2016/0046282 | A1* | 2/2016 | Yamazaki | B60W 20/40 477/5 |
| 2016/0167641 | A1* | 6/2016 | Yoon | B60L 58/12 701/22 |
| 2016/0167642 | A1* | 6/2016 | Debert | B60W 50/0097 701/22 |
| 2016/0176413 | A1* | 6/2016 | Oguri | B60W 50/14 701/22 |
| 2016/0214599 | A1* | 7/2016 | Doering | B60W 30/19 |
| 2017/0313298 | A1* | 11/2017 | Arnaiz | B60W 10/26 |
| 2018/0170382 | A1* | 6/2018 | Soliman | B60L 58/13 |
| 2018/0186375 | A1* | 7/2018 | O Meachair | B60W 50/0097 |
| 2018/0194358 | A1* | 7/2018 | Gaither | B60W 50/0097 |
| 2018/0265070 | A1* | 9/2018 | Wiesbeck | F02N 11/0837 |
| 2018/0273018 | A1* | 9/2018 | Follen | B60W 10/30 |
| 2018/0273021 | A1* | 9/2018 | Morimoto | B60K 6/442 |
| 2018/0281775 | A1* | 10/2018 | Lee | B60W 20/14 |
| 2018/0319391 | A1* | 11/2018 | Wiesbeck | B60W 50/0097 |

FOREIGN PATENT DOCUMENTS

| | | |
|---|---|---|
| DE | 101 49 905 B4 | 4/2005 |
| DE | 10 2008 015 046 A1 | 9/2008 |
| DE | 10 2010 062 379 A1 | 6/2010 |
| DE | 10 2008 064 018 A1 | 7/2010 |
| DE | 10 2011 077 656 A1 | 12/2012 |
| DE | 10 2013 104 533 A1 | 11/2013 |
| DE | 10 2013 016 569 A1 | 4/2015 |
| EP | 2 781 722 A1 | 9/2014 |
| FR | 2 863 953 A1 | 6/2005 |
| WO | WO 2012/069580 A1 | 5/2012 |

OTHER PUBLICATIONS

German-language Written Opinion (PCT/ISA/237) issued in PCT Application No. PCT/EP2016/078852 dated Mar. 7, 2017 (six (6) pages).

German-language Search Report issued in counterpart German Application No. 102015223588.2 dated Sep. 8, 2016 with English translation (thirteen (13) pages).

International Search Report (PCT/ISA/210) issued in PCT Application No. PCT/EP2016/078856 dated Mar. 9, 2017 with English translation (six (6) pages).

German-language Written Opinion (PCT/ISA/237) issued in PCT Application No. PCT/EP2016/078856 dated Mar. 9, 2017 (seven (7) pages).

\* cited by examiner

CONTROL SYSTEM HAVING AT LEAST ONE ELECTRONIC CONTROL UNIT FOR CONTROLLING AN INTERNAL COMBUSTION ENGINE IN A HYBRID VEHICLE

CROSS REFERENCE TO RELATED APPLICATIONS

This application is a continuation of PCT International Application No. PCT/EP2016/078852, filed Nov. 25, 2016, which claims priority under 35 U.S.C. § 119 from German Patent Application No. 10 2015 223 588.2, filed Nov. 27, 2015, the entire disclosures of which are herein expressly incorporated by reference.

This application contains subject matter related to U.S. application Ser. No. 15/988,123, entitled "Control System Having at Least One Electronic Control Unit for Controlling an Internal Combustion Engine in a Hybrid Vehicle" filed on May 24, 2018.

BACKGROUND AND SUMMARY OF THE INVENTION

The invention relates to a control system having at least one electronic control unit for controlling an internal combustion engine in a hybrid vehicle.

Hybrid vehicles have already been known for many years, including as mass-production vehicles, which contain at least one internal combustion engine and at least one electric motor as drive motors. Such hybrid vehicles have control systems with at least one electronic control unit, which in particular through correspondingly programmed function modules carry out various operating procedures for the selection of an operating mode that is adapted to the respectively current driving situation. Operating modes which are able to be selected are, in particular, purely electric driving (only the electric motor is driving: "E-mode", "E-driving"), driving purely by the internal combustion engine (only the internal combustion engine is driving), and/or hybrid-driven driving (both the electric motor and also the internal combustion engine are driving).

Primarily, known operating methods take into consideration the charge state of the battery or of another electric reservoir (e.g. super-cap) for the selection of the operating mode. In part here also parameters such as the current vehicle speed, the current driving performance or particular currently set customer functions are taken into consideration.

It is an object of the invention to further improve a control system with an operating method of the type described above.

This problem is solved according to the invention by a control system having at least one electronic control unit for controlling an internal combustion engine in a hybrid vehicle, wherein the control unit is configured such that it evaluates input signals for detecting data for identifying a current situation and for detecting at least one situation forecast in the near future with respect to an expected speed curve. The control system controls the restart and shutoff of the internal combustion engine at least depending on the expected speed curve.

The invention comprises generally a method for controlling the restart and the shutoff of an internal combustion engine in a hybrid vehicle, wherein by an evaluation of the current situation and of situations lying ahead, preferably in a defined forecast range, with regard to an expected speed curve and preferably also to a load curve as a function of a driver interaction and/or of the charge state of the high-voltage reservoir, the restart and shutoff performance is optimized in a defined manner, which will be discussed more precisely further below.

According to the invention, basically data for identifying a current situation and for identifying at least one situation prevailing in the near future (e.g. defined forecast horizon <5 km) are detected and evaluated with regard to the expected speed curve. Such data for the forecast of the speed curve comprise, in particular:

(i) map data concerning environment and/or traffic routing information of navigation systems (e.g. ADAS with RTTI) and (driver-specifically) learning systems for the prediction of the most likely route lying ahead, for the prediction of speeds in curves lying ahead, for the detection of speed limits lying ahead and current speed limits, for the prediction of the gradient of the route lying ahead, for the prediction of the average speed as a function of the traffic density on the route lying ahead, etc., (ii) sign recognition systems (e.g. KAFAS), in particular for the recognition of traffic signs with an influence on the speed which is to be expected, (iii) camera systems for detection of the current state of the lying-ahead and relevant signal light system (identifying of the traffic light status) and (learning) systems in the vehicle or via backend for the chronological prediction of the relevant signal light systems (forecast of the traffic light status), (iv) vehicle sensor technology (e.g. radar and KAFAS) for the detection of other road users driving ahead (in particular speed and acceleration of the preceding vehicle), and/or (v) all further systems which can contribute to a prediction of the expected speed curve.

Furthermore, preferably at least one driver interaction is determined, in particular through the detection of the accelerator pedal position of the respectively current load demand.

According to the invention, the restart and shutoff of the internal combustion engine is controlled primarily depending on the expected speed curve and the expected load curve in the predetermined forecast horizon and preferably also on current driver interaction. Furthermore, the restart and shutoff performance is optimized as a function of the operating state of the vehicle, such as in particular the charge state of the high-voltage reservoir.

The expected speed curve is preferably compared with the usual charge-state-dependent fixed maximum E-driving speed limits for purely electric driving (E-mode) in a charged state (CD="charge depleting", upper E-driving speed limit) and in the discharged state (CS="charge sustaining", lower E-driving speed limit). When the currently valid E-driving speed limit is fallen below by the actual speed, according to the prior art the internal combustion engine is shut off immediately. When the currently valid E-driving speed limit is exceeded by the actual speed, according to the prior art the internal combustion engine is restarted immediately. Furthermore, according to the prior art, a restart or respectively shutoff also takes place outside these speed limits, in so far as load limits dependent on speed and on charge state of the battery are exceeded or respectively fallen below. Through the invention, in particular the expected speed and load curve and not only the current speed and the current load are considered with regard to these hitherto rigidly set limits. The new situation (s) lying in the near future can lead, according to the invention, to the (continuous) shifting upward and downward and/or to the ignoring of these restart limits which were hitherto predetermined in a situation-independent manner.

The control by means of the control system according to the invention, or respectively the method according to the invention, for controlling the restart or shutoff of an internal combustion engine is carried out in a defined manner, namely preferably such that

- phases with only a briefly shut off or only briefly restarted internal combustion engine are prevented,
- the E-mode with a comparatively low load is maintained for as long as possible, or with a comparatively high or increasing load is prevented,
- a restart of the internal combustion engine is carried out preferably during acceleration processes and not during steady speed,
- long decelerations which are to be expected are preferably travelled with the internal combustion engine shut off, and/or
- the number of restart and shutoff procedures are reduced in client operation.

In an advantageous embodiment of the invention, proceeding from a purely electric driving state with acceleration to be expected to a value above the upper E-driving speed limit, a restart of the internal combustion engine is carried out already on increase of the load demand or respectively at the start of the acceleration and not only on exceeding of the largely static E-driving speed limit or respectively load limit.

In a further advantageous embodiment of the invention, the shutoff of the internal combustion engine is prevented if through a deceleration an only brief falling below of the E-driving speed limit is expected. Therefore, a renewed internal combustion engine restart shortly after its shutoff is prevented.

In a further advantageous embodiment of the invention, the shutoff of the internal combustion engine is carried out with deceleration which is to be expected until below the E-driving speed limit prematurely already with the load relief still before falling below the E-driving speed limit. A prerequisite for this is that the deceleration lasts long enough or the further expected speed curve remains below the E-driving speed limit.

Furthermore, likewise with decelerations and coasting operations, the target speed of which lies above the E-driving speed limit, the internal combustion engine is shut off (prematurely) with the load relief, in so far as a long-lasting load-free travel or deceleration is to be expected (e.g. coasting on a downhill gradient). Preferably this is the case when the (premature) shutoff is classified to be of value to the customer and efficient.

Preferably, the restart of the internal combustion engine is basically prevented without load demand irrespective of the E-driving limits, as long as no acceleration is to be expected or is carried out. This means that a restart of the internal combustion engine is as far as possible "masked" by an acceleration process. Restart processes of the internal combustion engine during a steady speed are prevented.

According to the prior art, a restart of the internal combustion engine then takes place in so far as the charge state of the high-voltage reservoir has fallen too far. In a further advantageous embodiment of the invention, the restart limits dependent on the charge state of the high-voltage reservoir are adapted so that a restart of the internal combustion engine does not occur during a steady speed. Instead, the restart of the internal combustion engine takes place prematurely or belatedly by means of a masking during an acceleration. This means that the change of a charge depleting strategy (discharging of the high-voltage reservoir at sufficient charge state) to a charge sustaining strategy (holding the low charge state of the high-voltage reservoir) is shifted in a targeted manner, in order to obtain an operating strategy which has greater customer value and is more efficient.

Preferably, for acoustic and dynamics reasons, a restart of the internal combustion engine is basically carried out already at the start of an acceleration process and not only after exceeding the currently valid E-driving speed limit, i.e. possibly at high load of the internal combustion engine, when through the expected speed curve an exceeding of one of these two limits or a battery discharge is foreseeable.

In a further advantageous embodiment of the invention, a restart of the internal combustion engine due to load is prevented in so far as the expected speed curve lies continuously below the currently valid E-driving speed limit (e.g. owing to a continuous speed limit distinctly below the currently valid E-driving speed limit or a red traffic light lying ahead). This situation-dependent restart robustness therefore prevents a brief restarting of the internal combustion engine with short load requirements on the part of the driver, and therefore increases the E-driving experience from the customer's point of view.

In a further advantageous embodiment of the invention, the brief shutoff of the internal combustion engine with short vehicle stops (e.g. in front of stop signs, prediction of a short remaining red phase of the traffic light, etc.) is prevented, in so far as the low charge state of the high-voltage reservoir does not permit electric driving.

A further advantageous embodiment of the invention provides, with reliable detection of a beginning overtaking procedure (e.g. by means of blinker signal, identification of a tractor, slow preceding vehicle relative to the speed limit with, at the same time, low traffic density, etc.), a premature restart of the internal combustion engine. The aim is to increase the response and the dynamics for the overtaking procedure.

In a further advantageous embodiment of the invention, the control unit is configured such that a restart of the internal combustion engine is shifted to a later upcoming acceleration process, when through the expected change of the operating strategy modes from charge depleting (discharging of the high-voltage reservoir) to charge sustaining (holding charge state or respectively charging the high-voltage reservoir) in any case a restart of the internal combustion engine is necessary, which otherwise falls chronologically into a steady speed.

Through the invention, the following advantages are achieved:

1) Increase of the driving experience in the E-mode by
    - extending of the driving phase in the E-mode (by means of reduction of restart due to load in expected low load situation)
    - optimization with regard to energy
    - restart robustness
2) Improvement of acoustics and customer reproducibility of the operating strategy by
    - prevention of brief shutoff or respectively restart of the internal combustion engine
    - reduction of shutoff oscillations
    - restart robustness (in the lower speed band)
    - reduction of restart and shutoff processes in customer operation
    - prevention of restart processes at steady speeds (inter alia by means of masking in accelerations)
    - advancing of restarts before high load situations (prevention of high coupling rotation speed)

3) Consumption reduction or respectively range increase by
    prevention of unnecessary E-mode driving with expected
      high load
    reduction of the restart losses by means of prevention of
      unnecessary shutoff processes
    increased use of recuperation energy by premature shutoff
      of the internal combustion engine
4) Sportiness or respectively response improvement by
    prevention of only brief shutoff processes before high
      load situations
    premature restart of the internal combustion engine before
      high load requirement Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
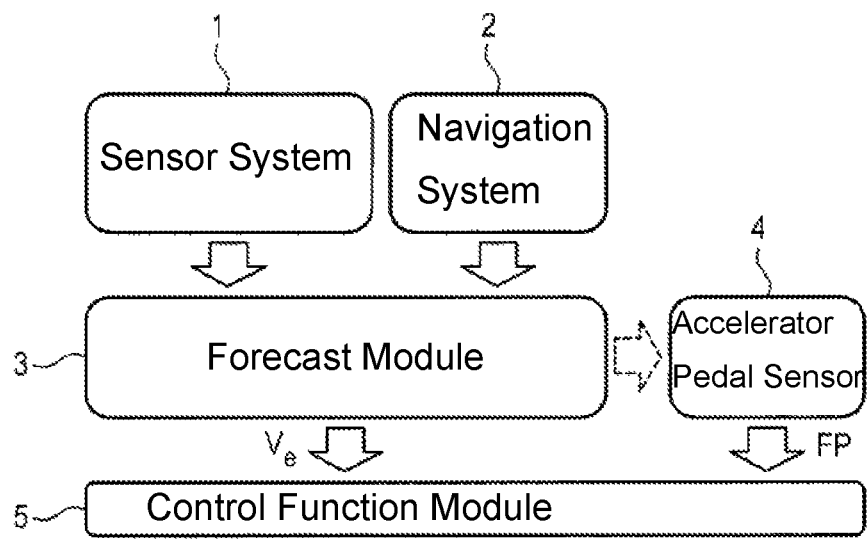
FIG. 1 is a schematic diagram of the essential necessary functional components for carrying out the operating method forming the basis of the control system.

In FIG. 1, a sensor system 1 belonging to the vehicle is illustrated, consisting for example of a camera and a front radar for the recognition of traffic signs and preceding vehicles, as is a navigation system 2 for traffic routing identification and prediction of traffic jams. The sensor system 1 can also comprise, for example, a sensor technology for identifying traffic lights or predicting traffic lights. Alternatively, the traffic light forecast can also be realized or respectively supported by use of a learning backend system. A traffic light forecast can be integrated into the determining of the expected speed and load curve. The data of these two systems 1 and 2 are input signals of a forecast module 3. The forecast module 3 is configured for determining an expected speed curve $v_e$ and a load curve on the basis of these data, and can be a function module of an electronic control unit which is not illustrated in further detail here. For the detection of the driver interaction, an accelerator pedal sensor 4 is provided here for example, the output signal FP of which reproduces the current load demand or respectively the load demand curve of the driver. The output signal FP and the expected speed curve $v_e$ determined in the forecast module 3 are input signals of a control function module 5, which is likewise part of the control unit. In the control function module 5 preferably a software program product is contained, by which the operating strategy of the control system according to the invention is realized.

The operating strategy builds on the following prior art. When the currently valid E-driving speed limit $eV_{Max}$ is fallen below by the actual speed, according to the prior art the internal combustion engine is shut off. When the currently valid E-driving speed limit $eV_{Max}$ is exceeded by the actual speed, according to the prior art the internal combustion engine is restarted immediately. The same applies on exceeding or respectively falling below restart or respectively shutoff limits defined in a speed-dependent and charge state-dependent manner through the load demand on the part of the driver. Through the invention, the expected speed curve $v_e$ and the expected load curve are considered with regard to these hitherto rigidly set limits. The two situations S1 and S2 lying in the near future here can lead, according to the invention, to the shifting and/or ignoring of these hitherto situation-independent predetermined E-driving speed limits and load limits. Details concerning this operating strategy are explained by way of the examples according to FIGS. 2 to 7.

In FIGS. 2 to 7, proceeding from a current situation S0, speed curves $v_e$ to be expected are illustrated for a first situation S1 in the near future and possibly also for a second situation S2 in the near future. These three situations lie in a defined forecast horizon of, for example, approximately 2 km. In each figure, at the top the operating strategy according to the prior art is illustrated by means of the speed curves $v_e$ with superimposed illustration of a restarted or shut off internal combustion engine. At the bottom, in an analogous manner, the operating strategy according to the invention is respectively illustrated. Here, by means of the continuous line, respectively the speed $v_e$ with a restarted internal combustion engine is illustrated, and by means of the dashed line respectively the speed $v_e$ with a shut off internal combustion engine is illustrated.

Figure 2:
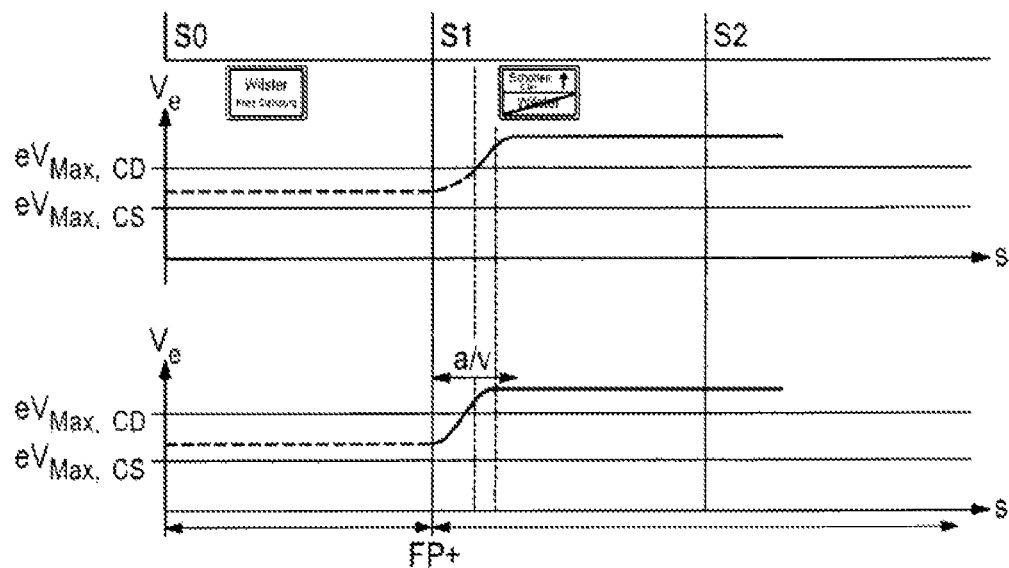
FIG. 2 graphically illustrates example 1: first situation in the near future: acceleration.

According to FIG. 2, the current situation S0 is a purely electric steady speed ($v_e$=const.), according to the preset speed (50 km/h), below the currently valid E-driving speed limit $eV_{Max,\ CD}$, i.e. with a shut off internal combustion engine. The first situation S1 is indicative, through the detection of a city limit sign, in the near future of an acceleration to approximately 100 km/h. Situation S2 is indicative, through the absence of new data, of a maintaining of the speed reached after the acceleration. At the moment FP+, a load demand is issued by the driver. According to the invention, with an acceleration to be expected to a value above the currently valid E-driving speed limit $eV_{Max,\ CD}$, a restart of the internal combustion engine is carried out already with an increase of the load demand. According to the prior art, a restart is carried out only after exceeding the currently valid E-driving speed limit $eV_{Max,\ CD}$ or after exceeding a speed-dependent load limit. With this example according to the invention, an advanced restart (=lowering of the usual a/v characteristic) is carried out, in order to improve the response performance. At the same time, the restart comfort is distinctly improved, because the connecting of the internal combustion engine takes place under a distinctly lower load and rotation speed.

Figure 3:
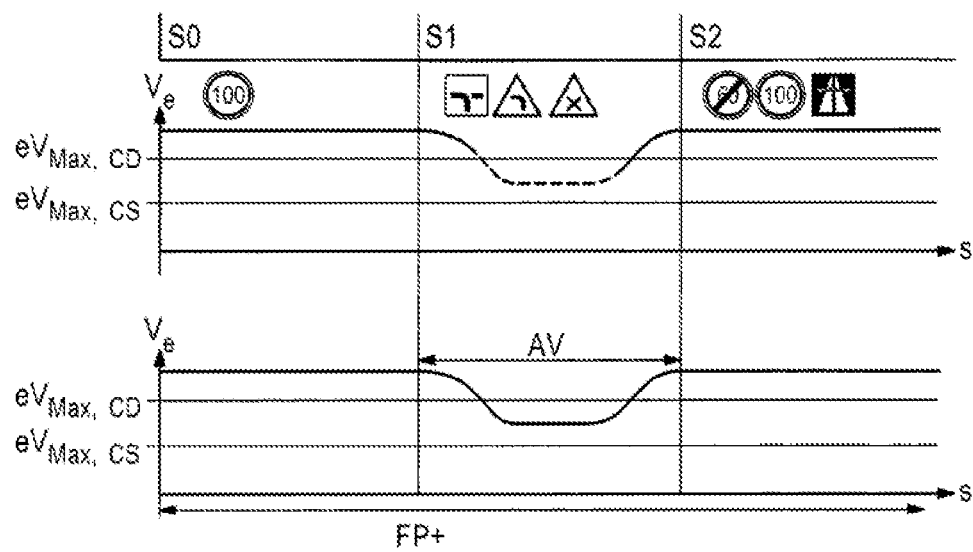
FIG. 3 graphically illustrates example 2: first situation in the near future: turning-off procedure or curve.

According to FIG. 3, the current situation S0 is a steady speed outside the built-up area at 100 km/h, which is above the currently valid E-driving speed limit $eV_{Max,\ CD}$, i.e. with an activated internal combustion engine. The first situation S1 is indicative, for example through the recognition of a warning sign for a bend or through evaluation of map information with regard to the bend radius, in the near future of a turning procedure or a bend, therefore a brief deceleration. Situation S2 is indicative, through (still) valid speed limits, of a return to the current situation S0. According to the invention, the shutoff of the internal combustion engine is now prevented (switch-off prevention AV), because only a brief falling below of the currently valid E-driving speed limit $eV_{Max,\,CD}$ is expected. Through this example according to the invention, compared to the prior art, which provides a brief shutoff of the internal combustion engine, above all the comfort and the dynamics are increased.

Figure 4:
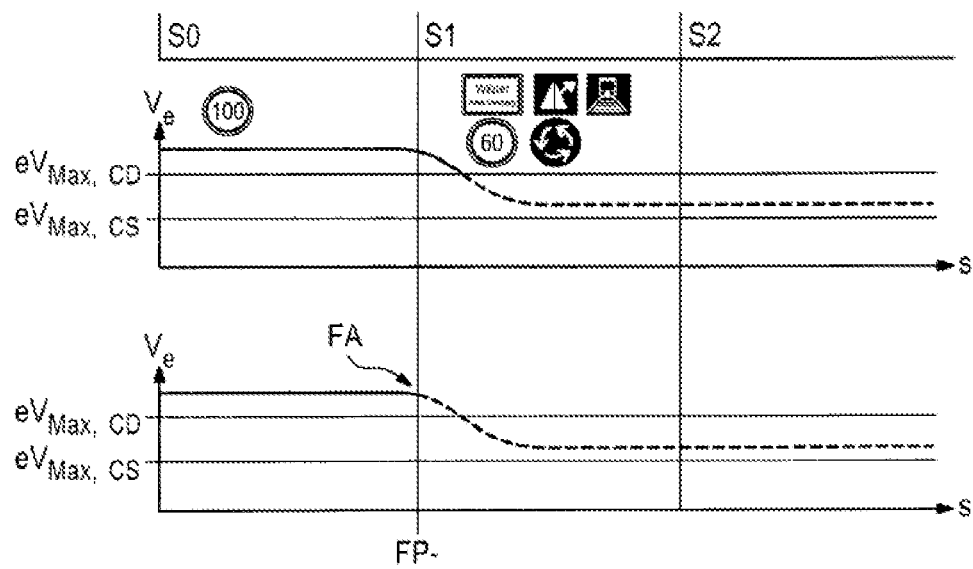
FIG. 4 graphically illustrates example 3: first situation in the near future: deceleration up to shortly above the lower E-driving speed limit.

According to FIG. 4 the current situation S0 is a steady speed, outside the built-up area at 100 km/h, which is above the currently valid E-driving speed limit $eV_{Max,\,CD}$, i.e. with an activated internal combustion engine. The first situation S1 is indicative, for example through the recognition of a town sign, of a longer-lasting speed reduction to below the E-driving speed limit $eV_{Max,\,CD}$. The new level of the expected speed is not exceeded again in a possible situation S2. According to the invention, the shutoff of the internal combustion engine at a deceleration, which is to be expected, to below the E-driving speed limit $eV_{Max,\,CD}$ or respectively $eV_{Max,\,CS}$ is already carried out with the load relief FP— still before the falling below of the E-driving speed limit (premature shutoff FA). According to the prior art, a shutoff of the internal combustion engine is carried out only after falling below of the E-driving speed limit $eV_{Max,\,CD}$ or respectively $eV_{Max,\,CS}$. Through this example according to the invention, the efficiency is increased.

Figure 5:
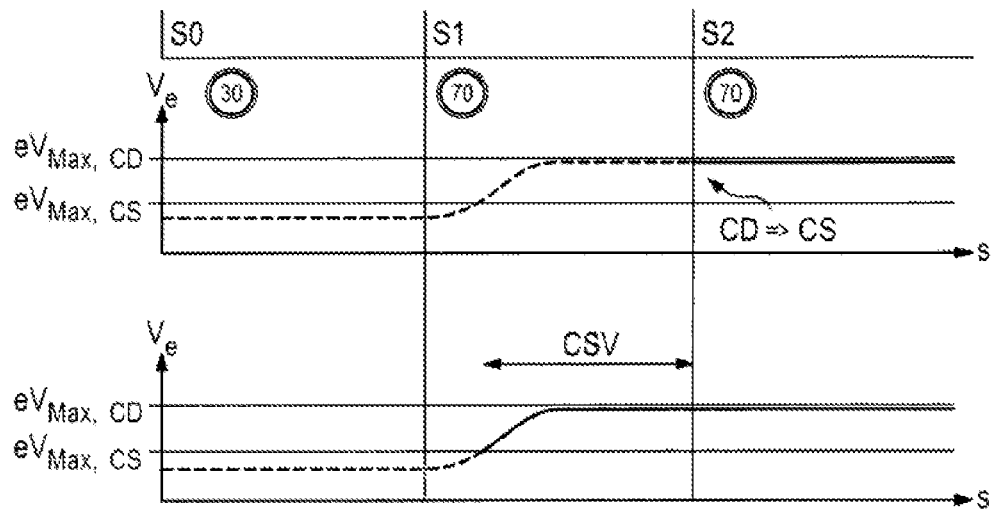
FIG. 5 graphically illustrates example 4: first situation in the near future: acceleration; second situation in the near future: discharging battery.

According to FIG. 5 the current situation S0 is a purely electric steady speed according to the preset speed 30 km/h, therefore below the E-driving speed limit $eV_{Max,\,CS}$, for the operating state to keep charge state (charge sustaining). The first situation S1 is indicative, through the identifying of a speed limit of 70 km/h in the near future, of an acceleration to approximately 70 km/h. Situation S2 is indicative, through the absence of new data, of a maintaining of the speed reached after the acceleration. After the speed increase has taken place, in situation S2 an operating strategy change from charge depleting CD (i.e. preferably electric driving) to charge sustaining CS (keeping charge state) owing to a low charge state of the high-voltage reservoir is to be expected. This change, according to the prior art, is connected with a restart of the internal combustion engine independent of load and speed. According to the invention, a restart of the internal combustion engine is carried out already at the start of an acceleration process. The effect is a pre-shifting CSV of the transition from the discharging process CD to the charging process CS, in order to "mask" the restart in the acceleration. Hereby, compared to the prior art, which according to the example here provides a restart during the steady speed, the reproducibility and the comfort are increased.

Figure 6:
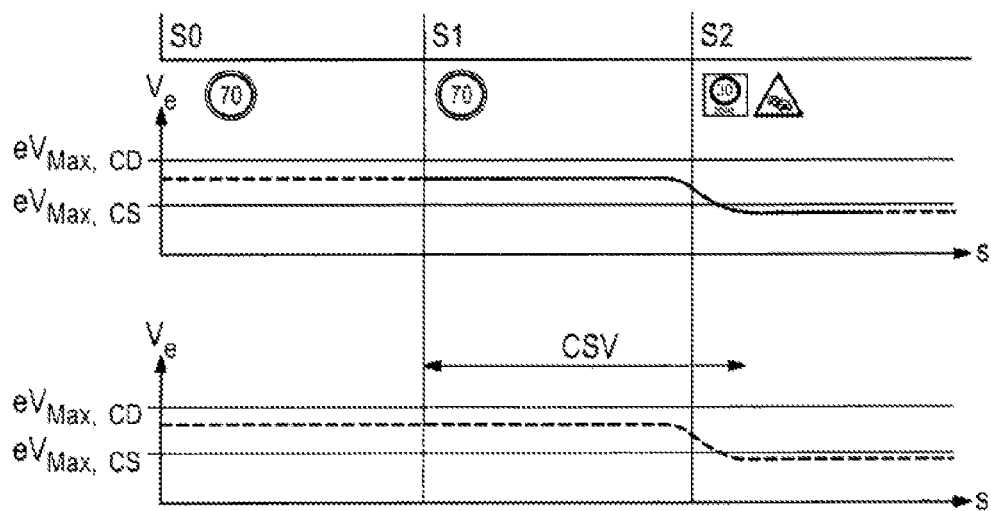
FIG. 6 graphically illustrates example 5: second situation in the near future: deceleration up to below the lower E-driving speed limit.

According to FIG. 6 the current situation S0 is a purely electric steady speed outside the built-up area at 70 km/h between the E-driving speed limits $eV_{Max,\,CD}$ and $eV_{Max,\,CS}$. The first situation S1 provides, according to the prior art, for a restart, because a change of the operating strategy from charge depleting CD (i.e. preferably electric driving) to charge sustaining CS (keeping charge state) is imminent owing to a low charge state of the high-voltage reservoir. The second situation S2 is indicative, for example, through the identifying of the speed limit 30 km/h, of a longer-lasting speed reduction below the valid new E-driving speed limit $eV_{Max,\,CS}$ in the charge sustaining CS. According to the invention here without the presence of a load demand, the restarting of the internal combustion engine, which is to be attributed to the upcoming change of the currently valid E-driving speed limit from $eV_{Max,\,CD}$ to $eV_{Max,\,CS}$, is shifted to a later point in time (shifting CSV of the transition from DC to CS to a later acceleration process). The advantage resulting herefrom is an increase of the E-driving experience, of customer comfort and an increased reproducibility of the operating strategy from the customer's point of view.

Figure 7:
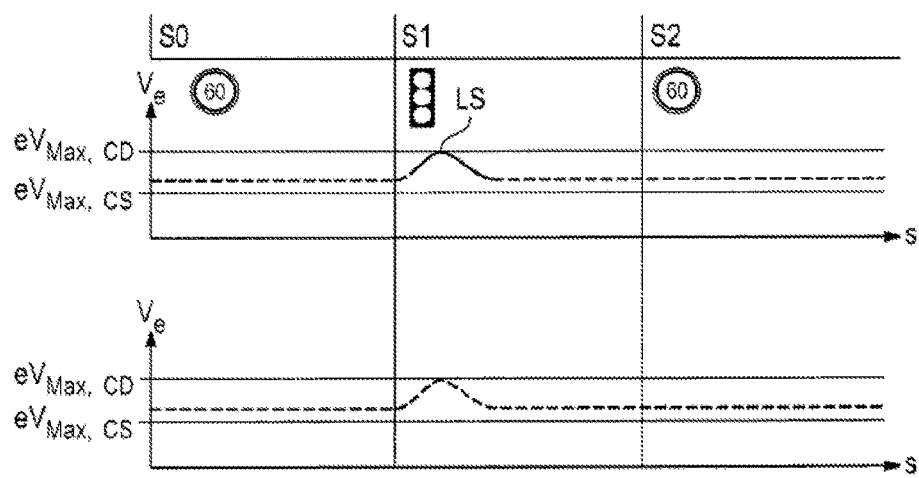
FIG. 7 graphically illustrates example 6: first situation in the near future: no increase in the expected speed.

According to FIG. 7, the current situation S0 is a purely electric steady speed outside the built-up area at, for example 60 km/h, distinctly below the currently valid E-driving speed limit $eV_{Max,\,CD}$ (or respectively $eV_{Max,\,CS}$). Also on the section lying ahead (situation S1 and S2) no increase to the expected speed is predicted. When the driver demands a brief load peak LS, for example for driving over a yellow traffic light phase, according to the current prior art on exceeding the speed-dependent load limit the internal combustion engine restarts and shuts off again after a short period of time. According to the invention, a situation-dependent restart robustness prevents this brief restart by means of raising the restart limits, which are due to load, to a higher level, in so far as it is foreseeable that a longer load request is not concerned. Very high load requests and an exceeding of the current valid E-driving speed limit also still bring about a restart of the internal combustion engine. The advantages of the situation-dependent restart robustness are an increase in the efficiency and of the E-driving experience and a reduction of the number of internal combustion engine restarts in customer operation.

FIGS. 1-7 only show examples of an expected speed curve, which can result from all information mentioned in the introduction. In addition, further examples, such as a premature restart of the internal combustion engine before an identified overtaking procedure or a shutoff preventer in the case of brief stops (stop sign, traffic light with short remaining red phase, etc.) are not presented separately.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:
1. A control system, comprising:
an electronic control unit that controls an internal combustion engine in a hybrid vehicle, wherein
the control unit is operatively configured to:
evaluate input signals for detecting data identifying a current situation and for detecting at least one future situation forecast in a near future with respect to an expected speed curve,
control a restart and a shutoff of the internal combustion engine in the hybrid vehicle as a function of the expected speed curve, and
carry out the restart or shutoff of the internal combustion engine in a manner deviating from predetermined E-driving speed limits and/or predetermined E-driving load limits.
2. The control system according to claim 1, wherein the control unit is further operatively configured to:
additionally detect at least one input signal for evaluating a load curve and/or another driver interaction, and
control the restart or shutoff of the internal combustion engine also as a function of the driver interaction.
3. The control system according to claim 1, wherein the control unit is further operatively configured such that:
a restart of the internal combustion engine is already advanced or shifted to an acceleration process when through an expected change of operating strategy modes from charge depleting to charge sustaining in any case a restart of the internal combustion engine is necessary, which otherwise falls chronologically into a steady speed.

4. The control system according to claim 1, wherein the control unit is further operatively configured to:
carry out the restart or shutoff of the internal combustion engine depending on dynamically shifted E-driving speed limits and/or E-driving load limits.

5. The control system according to claim 1, wherein the control unit is further operatively configured to:
with an expected acceleration to a value above a currently valid E-driving speed limit, carry out a restart of the internal combustion engine as soon as there is an increase of a load demand.

6. The control system according to claim 1, wherein the control unit is further operatively configured to:
prevent the shutoff of the internal combustion engine when an actual speed is expected to fall below the currently valid E-driving speed limit for only a short duration.

7. The control system according to claim 1, wherein the control unit is further operatively configured to:
with an expected deceleration to below the currently valid E-driving speed limit, carry out the shut off of the internal combustion engine as soon as there is a load relief before the actual speed falls below the currently valid E-driving speed limit.

8. An electronic control unit of a control system that controls an internal combustion engine in a hybrid vehicle, comprising:
a processor and associated program memory having stored therein program code sections that, when executed, carry out a control to:
evaluate input signals for detecting data identifying a current situation and for detecting at least one future situation forecast in a near future with respect to an expected speed curve,
control a restart and a shutoff of the internal combustion engine in the hybrid vehicle as a function of the expected speed curve, and
carry out the restart or shutoff of the internal combustion engine in a manner deviating from predetermined E-driving speed limits and/or predetermined E-driving load limits.

9. A method of controlling a restart and a shutoff of an internal combustion engine in a hybrid vehicle, the method comprising the steps of:
evaluating a current situation and at least one situation forecast ahead of the vehicle;
at least with regard to an expected speed curve as a function of a driver interaction and/or of a charge state of a high-voltage reservoir of the hybrid vehicle, controlling the restart and the shutoff of the internal combustion engine in a defined manner deviating from predetermined E-driving speed limits and/or predetermined E-driving load limits.

* * * * *